US010027530B2

(12) United States Patent
Mahkonen et al.

(10) Patent No.: US 10,027,530 B2
(45) Date of Patent: Jul. 17, 2018

(54) SYSTEM AND METHOD FOR TROUBLESHOOTING SDN NETWORKS USING FLOW STATISTICS

(71) Applicant: Telefonaktiebolaget L M Ericsson (publ), Stockholm (SE)

(72) Inventors: Heikki Mahkonen, San Jose, CA (US); Ravi Manghirmalani, Fremont, CA (US); Ming Xia, San Jose, CA (US); Meral Shirazipour, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 154 days.

(21) Appl. No.: 14/929,232

(22) Filed: Oct. 30, 2015

(65) Prior Publication Data
US 2017/0126475 A1 May 4, 2017

(51) Int. Cl.
H04L 12/26 (2006.01)
H04L 12/24 (2006.01)
(Continued)

(52) U.S. Cl.
CPC .... H04L 41/0631 (2013.01); G06F 17/30312 (2013.01); H04L 43/04 (2013.01);
(Continued)

(58) Field of Classification Search
CPC . H04L 41/0631; H04L 43/04; H04L 43/0829; H04L 43/0864; H04L 69/163; G06F 17/30312
See application file for complete search history.

(56) References Cited

U.S. PATENT DOCUMENTS 7,697,452 B2 * 4/2010 Tachibana ............... H04L 43/00 370/237
2009/0168645 A1 * 7/2009 Tester ................. H04L 41/0677 370/225

(Continued)

FOREIGN PATENT DOCUMENTS

WO 2012130264 A1 10/2012
WO 2013044974 A1 4/2013

OTHER PUBLICATIONS

Van Adrichem, et al., "OpenNetMon: Network monitoring in OpenFlow Software-Defined Networks", 2014 IEEE Network Operations and Management Symposium (NOMS), May 5, 2014, XP032608950, pp. 1-8.

(Continued)

Primary Examiner — Scott B Christensen
(74) Attorney, Agent, or Firm — Nicholson De Vos Webster & Elliott, LLP

(57) ABSTRACT

A method is implemented by a computing device to determine a root cause of a performance issue in a software defined networking (SDN) network using flow statistics maintained by hosts in the network. The method includes receiving a request to perform a root cause analysis (RCA) for a first flow in the network that is experiencing a performance issue, obtaining flow path information for flows in the network, and obtaining flow statistics for the flows in the network, where the flow statistics are end-to-end flow statistics maintained by one or more hosts in the network. The method further includes executing an RCA algorithm for the first flow, where the RCA algorithm determines a root cause of a performance issue experienced by the first flow based on the flow path information and the flow statistics.

22 Claims, 11 Drawing Sheets

(51) Int. Cl.
H04L 29/06 (2006.01)
G06F 17/30 (2006.01)
(52) U.S. Cl.
CPC ...... *H04L 43/0829* (2013.01); *H04L 43/0864* (2013.01); *H04L 69/163* (2013.01)

(56) References Cited

U.S. PATENT DOCUMENTS

| | | | | |
|---|---|---|---|---|
| 2011/0149745 | A1* | 6/2011 | Filho | H04L 63/1416 370/242 |
| 2013/0258847 | A1* | 10/2013 | Zhang | H04L 47/22 370/232 |
| 2015/0195184 | A1* | 7/2015 | Vasseur | H04L 41/5025 706/12 |
| 2017/0048110 | A1* | 2/2017 | Wu | H04L 41/12 |

OTHER PUBLICATIONS

"Artificial neural network," Wikipedia, Wikimedia Foundation, Inc., Oct. 25, 2015, downloaded from the internet at https://en.wikipedia.org/wiki/Artificial_neural_network on Oct. 30, 2015, 19 pages.

"K-means clustering," Wikipedia, Wikimedia Foundation, Inc., Oct. 18, 2015, downloaded from the internet at https://en.wikipedia.org/wiki/K-means_clustering on Oct. 30, 2015, 19 pages.

"The netfilter.org project," netfiler, Harald Welte, Pablo Neira Ayuso, downloaded from the internet at http://www.netfilter.org/ on Oct. 30, 2015, 2 pages.

"Network Configuration Protocol," netconf central, Andy Bierman, downloaded from the internet at http://netconfcentral.org/netconf_docs on Oct. 30, 2015, 17 pages.

"OpenFlow Switch Specification," Version 1.3.0 (Wire Protocol 0x04), ONF TS-066, Open Networking Foundation (ONF), Jun. 25, 2012, 106 pages.

"Software-Defined Networking: The New Norm for Networks," Open Networking Foundation (ONF) White Paper, Apr. 13, 2012, 12 pages.

RFC 793: Postel, J., "Transmission Control Protocol," DARPA Internet Program Protocol Specification, Network Working Group, Request for Comments, Sep. 1981, 91 pages.

RFC 1157: Case, et al., "A Simple Network Management Protocol (SNMP)," Network Working Group, Request for Comments, May 1990, 36 pages.

RFC 6897: Scharf, et al., "Multipath TCP (MPTCP) Application Interface Considerations," Internet Engineering Task Force (IETF), Request for Comments, Mar. 2013, 31 pages.

Gite, V., "ss: Display Linux TCP / UDP Network and Socket Information," nixCraft, Jun. 22, 2012, downloaded from the internet at http://www.cyberciti.biz/tips/linux-investigate-sockets-network-connections.html on Oct. 30, 2015, 7 pages.

Nguyen, B., "/proc" Linux Filesystem Hierarchy, Chapter 1.14, Jan. 30, 2004, downloaded from the internet at http://www.tldp.org/LDP/Linux-Filesystem-Hierarchy/html/proc.html on Oct. 30, 2015, 32 pages.

Hierarchy/html/proc.html on Oct. 30, 2015, 32 pages.

* cited by examiner

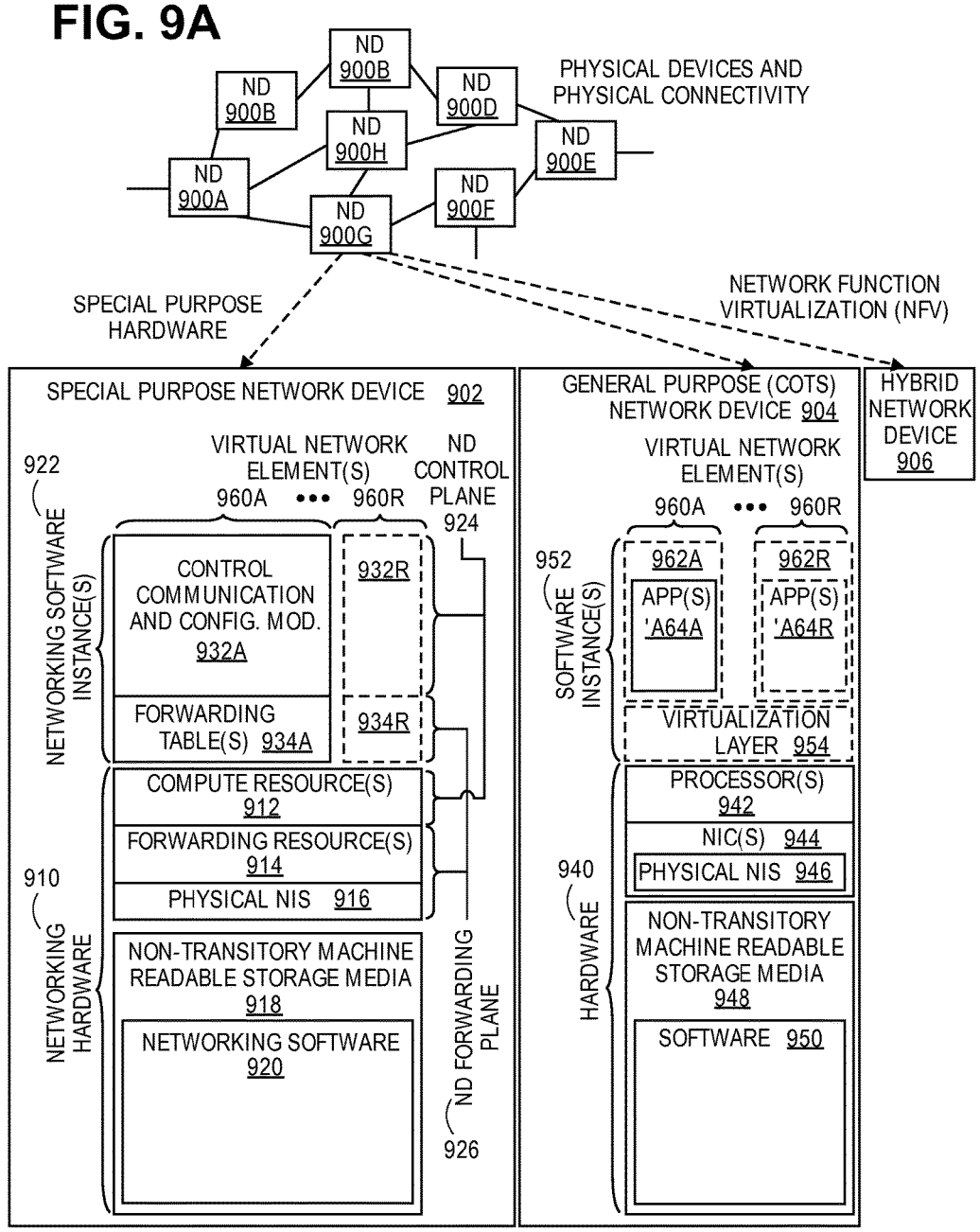

SYSTEM AND METHOD FOR TROUBLESHOOTING SDN NETWORKS USING FLOW STATISTICS

FIELD

Embodiments of the invention relate to the field of packet networks, and more specifically, to network troubleshooting.

BACKGROUND

Software defined networking (SDN) is an approach to computer networking that employs a split architecture network in which the forwarding (data) plane is decoupled from the control plane. The use of a split architecture network simplifies the switches implementing the forwarding plane by shifting the intelligence and decision making of the network into one or more controllers that oversee the switches. SDN facilitates rapid and open innovation at the network layer by providing a programmable network infrastructure. SDN networks are becoming popular in cloud computing datacenters and enterprise networks.

Network monitoring is an important part of network operation. Network monitoring helps network operators detect unwanted networking behavior and other types of abnormalities in the network. Existing network monitoring solutions typically require deploying feature-rich monitoring components such as deep packet inspection (DPI) nodes, probing equipment, packet classifiers, and filters into the network. These active monitoring components can be expensive and thus increase the capital expenditure of the network operator. Furthermore, these monitoring components typically require some amount of configuration and maintenance in order to function properly, which increases the operating expenditure of the network operator.

Furthermore, existing network monitoring solutions consume a significant amount of network resources attempting to "normalize" the information collected from the network (e.g., DPI trying to follow a Transmission Control Protocol (TCP) flow state, a big data algorithm crunching through a packet trace database to find a problematic flow, and probing equipment inspecting network traffic). These types of network monitoring solutions do not scale well and thus may not provide adequate network monitoring coverage, especially as networks get larger and more complex.

SUMMARY

A method is implemented by a computing device to determine a root cause of a performance issue in a software defined networking (SDN) network using flow statistics maintained by hosts in the network. The method includes receiving a request to perform a root cause analysis (RCA) for a first flow in the network that is experiencing a performance issue, obtaining flow path information for flows in the network, and obtaining flow statistics for the flows in the network, where the flow statistics are end-to-end flow statistics maintained by one or more hosts in the network. The method further includes executing an RCA algorithm for the first flow, where the RCA algorithm determines a root cause of a performance issue experienced by the first flow based on the flow path information and the flow statistics.

A computing device is configured to determine a root cause of a performance issue in a software defined networking (SDN) network using flow statistics maintained by hosts in the network. The computing device includes a non-transitory machine-readable storage medium having stored therein a root cause analysis (RCA) component and a set of one or more processors coupled to the non-transitory machine-readable storage medium. The set of one or more processors are configured to execute the RCA component. The RCA component is configured to receive a request to perform a root cause analysis for a first flow in the network that is experiencing a performance issue, obtain flow path information for flows in the network, and obtain flow statistics for the flows in the network, where the flow statistics are end-to-end flow statistics maintained by one or more hosts in the network. The RCA component is further configured to execute an RCA algorithm for the first flow, wherein the RCA algorithm determines a root cause of a performance issue experienced by the first flow based on the flow path information and the flow statistics.

A non-transitory machine-readable storage medium has computer code stored therein that is to be executed by a set of one or more processors of a computing device. The computer code, when executed by the computing device, causes the computing device to perform operations for determining a root cause of a performance issue in a software defined networking (SDN) network using flow statistics maintained by hosts in the network. The computing device is to be coupled to a network monitoring system that collects real-time network and cloud metrics in the network. The operations include receiving a request to perform a root cause analysis (RCA) for a first flow in the network that is experiencing a performance issue, obtaining flow path information for flows in the network, and obtaining flow statistics for the flows in the network, where the flow statistics are end-to-end flow statistics maintained by one or more hosts in the network. The operations further include executing an RCA algorithm for the first flow, where the RCA algorithm determines a root cause of a performance issue experienced by the first flow based on the flow path information and the flow statistics.

BRIEF DESCRIPTION OF THE DRAWINGS

The invention may best be understood by referring to the following description and accompanying drawings that are used to illustrate embodiments of the invention. In the drawings:

FIG. 9A illustrates connectivity between network devices (NDs) within an exemplary network, as well as three exemplary implementations of the NDs, according to some embodiments.

FIG. 9B illustrates an exemplary way to implement a special-purpose network device according to some embodiments.

DESCRIPTION OF EMBODIMENTS

Figure 1:
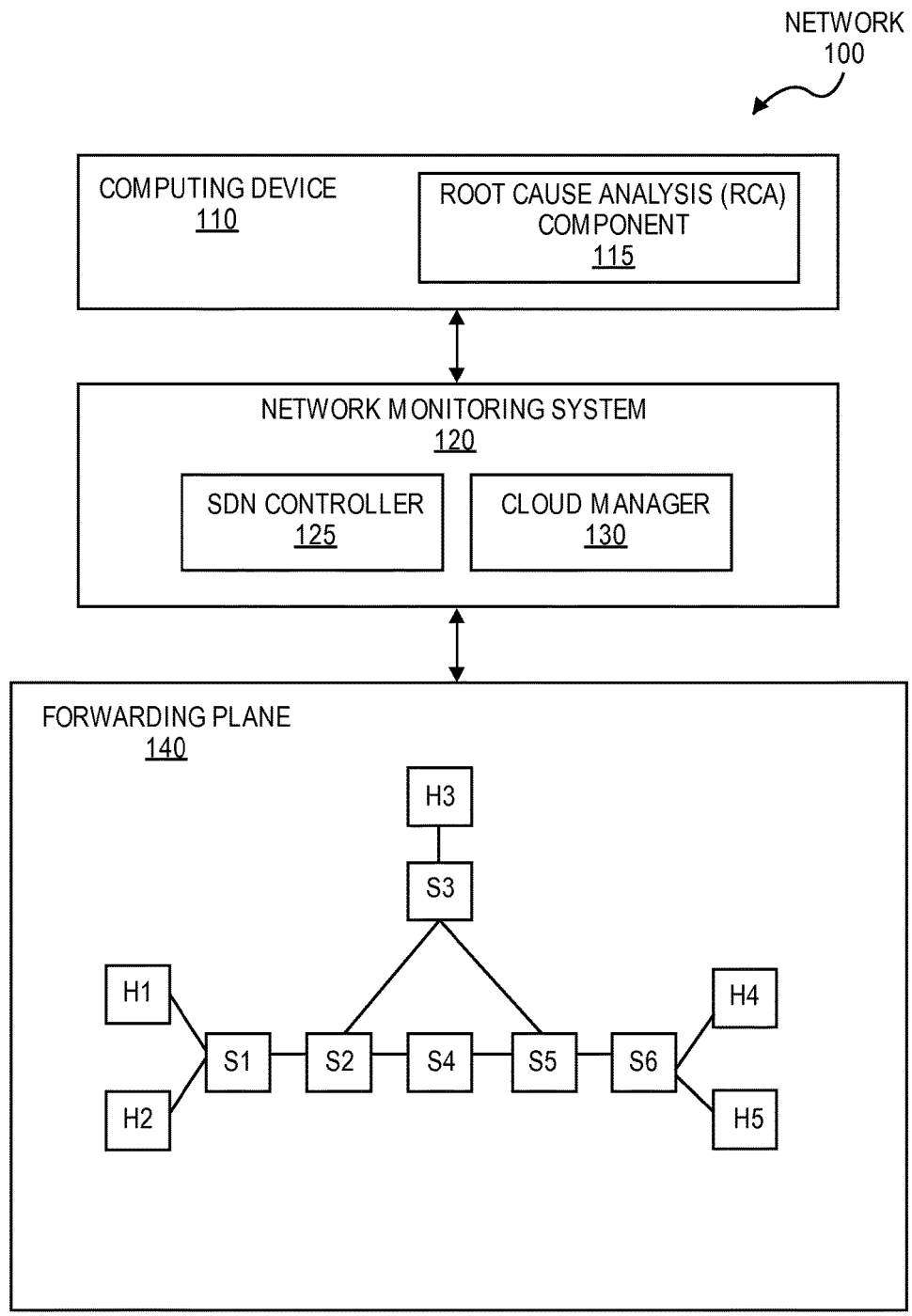
FIG. 1 is a block diagram illustrating a network in which root cause analysis (RCA) can be implemented, according to some embodiments.

The following description describes methods, systems, and apparatus for determining a root cause of a performance issue in a software defined networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, existing network monitoring solutions typically require deploying and configuring various types of network monitoring equipment in the network. Also, existing network monitoring solutions consume a significant amount of computational resources attempting to "normalize" the information collected from the network. Embodiments described herein provide a technique for determining a root cause of a performance issue in the network (e.g., due to link failure or node failure) that does not require deploying specialized monitoring equipment in the network and does not require elaborate storage of packet samples or traces. Embodiments achieve this by leveraging information that is already available in the network (e.g., flow path information and flow statistics). Furthermore, embodiments utilize machine learning techniques to detect performance issues in the network as they occur or even predict performance issues in the network before they occur. Other embodiments are also described and claimed.

FIG. 1 is a block diagram illustrating a network in which root cause analysis (RCA) can be implemented, according to some embodiments. In the illustrated embodiment, the network 100 includes a computing device 110, a network monitoring system 120, and a forwarding plane 140. The forwarding plane 140 includes switches S1-S6 and hosts H1-H5. The forwarding plane is responsible for forwarding traffic from one host to another host via the switches. The hosts H1-H5 can be a data center server or client. The switches S1-S6 can be any type of network device that can be programmed by a controller (e.g., a software defined networking (SDN) controller 125). The network monitoring system 120 may deploy and configure monitoring probes in the network to monitor a state of the network. For example, the network monitoring system 120 may deploy probes in the network that measure packet counts or similar metrics for physical switches and/or virtual switches in the network 100 (e.g., volume, rate, drop volume, and drop rate). As another example, the network monitoring system 120 may deploy probes in the network that measure physical infrastructure metrics such as central processing unit (CPU) load, memory usage, bandwidth usage, virtual network interface (Rx/Tx) data, storage usage, and similar metrics. The network monitoring system 120 is thus able to collect real-time network and cloud metrics in the network.

As illustrated, the network monitoring system 120 includes an SDN controller 125 and a cloud manager 130. The SDN controller 125 can control traffic routing in the forwarding plane 140 by configuring the forwarding behavior of switches S1-S6 in the network 100. In one embodiment, the SDN controller 125 configures the switches S1-S6 using a control plane communications protocol such as OpenFlow (e.g., OpenFlow 1.3). The cloud manager 130 can instantiate and manage virtual resources in the network 100. For example, the cloud manager 130 may instantiate and mange virtual machines, virtual switches, and other types virtual resources in the network 100.

As illustrated, the computing device 110 is coupled to the network monitoring system 120 and has a root cause analysis (RCA) component 115 installed therein. As will be described in addition detail below, the computing device 110 may execute the RCA component 115 to determine a root cause of a performance issue experienced by a flow in the network. A flow, as used herein, refers to a sequence of packets from a source host to a destination host. The RCA component 115, when executed by the computing device, may cause the computing device to execute an RCA algorithm for determining a root cause of a performance issue experienced by a flow in the network. For example, the RCA algorithm may determine that a particular link on the path of the flow is congested and this is causing the flow to experience performance issues (e.g., longer delay). The RCA algorithm may determine the root cause based on analyzing flow path information for flows in the network and flow statistics for flows in the network. The RCA component 115 may interface with the network monitoring system to collect the flow path information and/or the flow statistics.

Although the diagram illustrates the computing device 110 and RCA component 115 as being separate from the network monitoring system, the computing device and/or RCA component 115 may be included as part of the network monitoring system 120. For example, the RCA component 115 may be an application that sits on top of the SDN controller 125 and/or the cloud manager 130. Also, as will be described in additional detail below, the RCA component 115 may utilize machine learning techniques to predict performance issues in the network.

RCA Algorithm

In one embodiment, the RCA algorithm determines a root cause based on analyzing flow path information for flows in the network 100 and flow statistics for flows in the network 100. The first piece of information that the RCA algorithm uses is the flow path information for flows in the network 100. In one embodiment, the RCA algorithm relies on the SDN controller 125 of the network monitoring system 120 to determine flow path information in the network. The SDN controller 125 typically has global visibility of the network topology of the network it is controlling (e.g., network 100). The network topology provides a view of the switches S1-S6 and the links between the switches S1-S6 in the network. The view of the network topology is commonly referred to as a network information base (NIB). The SDN controller 125 can use the NIB to determine the flow paths of flows in the network 100. In one embodiment, the SDN controller 125 can collect flow cache information and/or routing table information from the switches S1-S6 in the network 100, and use this information (along with knowledge of the network topology) to determine flow path information for flows in the network 100. In one embodiment, the forwarding scheme used in an SDN network can provide flow path information. The SDN controller 125 can make the flow path information available to the RCA algorithm.

The second piece of information that the RCA algorithm uses are the flow statistics for flows in the network 100. An example of flow statistics are end-to-end Transmission Control Protocol (TCP) statistics. The descriptions herein will be primarily use TCP statistics as an example of flow statistics. However, it should be understood that TCP statistics is used by way of example and not limitation. Other types of end-to-end flow statistics (e.g., Stream Control Transmission Protocol (SCTP) statistics, Real-Time Transport Protocol (RTP) statistics or User Datagram Protocol (UDP) statistics, etc.) can be used consistent with the principles and structures described herein. TCP statistics are typically maintained by the hosts H1-H5. A host (and more specifically the operating system of the host) typically collects TCP statistics for each TCP connection that the host establishes. For example, the Linux operating system provides various TCP statistics for all open sockets in the kernel and this information is available in the user space through the "/proc" file system or with standard user-level tools like "ss". The TCP statistics collected by the host can include the internet protocol (IP) address and port of both ends of the flow, the round trip time (RTT), packet loss rate, and number of retransmissions. Other TCP flow statistics that can be collected from the kernel level of the host operating system include state of the TCP connection, congestion algorithm details, bandwidth, and data amount information.

In one embodiment, the RCA algorithm relies on the SDN controller 125 to determine TCP statistics for flows in the network 100. The SDN controller 125 typically does not have access to the end-to-end TCP statistics of the ongoing flows in the network 100. However, as mentioned above, the hosts H1-H5 typically maintain these TCP statistics. The SDN controller 125 or other entity of the network monitoring system 120 may obtain TCP statistics from a host by querying the host. For this purpose, a communications interface can be introduced between the network monitoring system 120 and the hosts H1-H5, and the network monitoring system 120 can use this communications interface to query the hosts H1-H6 for TCP statistics. The communications interface can be established as a direct interface with a host or via a southbound interface in the SDN controller 125 or the cloud manager 130 of the network monitoring system 120. The communications interface can be implemented as a Representational State Transfer (REST) API or a Secure Shell (SSH) secure connection. The amount of traffic required over this communications interface is not expected to be significant, as only a subset of the TCP statistics maintained by the host is expected to be transferred over this communications interface and data packet payload is not expected to be transferred over this communications interface. If TCP statistics are not made directly available by the host (e.g., the TCP statistics are hidden and not available in a virtual machine (VM)), a hypervisor can be configured to collect TCP statistics using a modified filtering mechanism (e.g., iptables). This filtering mechanism can follow the TCP flows inside the hypervisor kernel and collect the TCP statistics for the flows that originate/terminate with the respective VMs managed by the hypervisor.

In one embodiment, instead of directly querying the hosts H1-H6 for TCP statistics, the network monitoring system 120 configures the hosts H1-H5 to make TCP statistics available to the network monitoring system 120 upon certain conditions. In one embodiment, the network monitoring system 120 configures the hosts H1-H5 to publish TCP statistics to the network monitoring system 120. In another embodiment, the network monitoring system 120 configures the hosts H1- to publish TCP statistics to a database that is accessible by the network monitoring system 120. The network monitoring system 120 may then access the TCP statistics published in the database. An agent may be installed on the host for the purpose of publishing TCP statistics to the network monitoring system or a database. The agent should preferably have access to the TCP statistics maintained by the host. The network monitoring system 120 may have a control channel to the agent in the host over which the network monitoring system 120 can configure the agent with the type of TCP statistics that the network monitoring system 120 wishes to receive. For example, the network monitoring system 120 may configure the agent to publish all socket events (e.g., socket open/close, socket errors, etc.). In one embodiment, the network monitoring system 120 may configure the agent to only publish TCP statistics for flows that have metrics that exceed or fall below a pre-defined threshold value. In this way, the network monitoring system 120 can control the amount of TCP statistics that it receives from the hosts. The RCA algorithm can thus leverage the network monitoring system 120 to query for flow path information of flows in the network 100 and flow statistics of flows in the network 100.

Once the RCA algorithm has access to the flow path information and the flow statistics, the RCA algorithm can use this information to determine a root cause of a performance issue in the network 100. An example of an RCA algorithm is described with reference to FIG. 2, FIG. 3A, and FIG. 3B.

Figure 2:
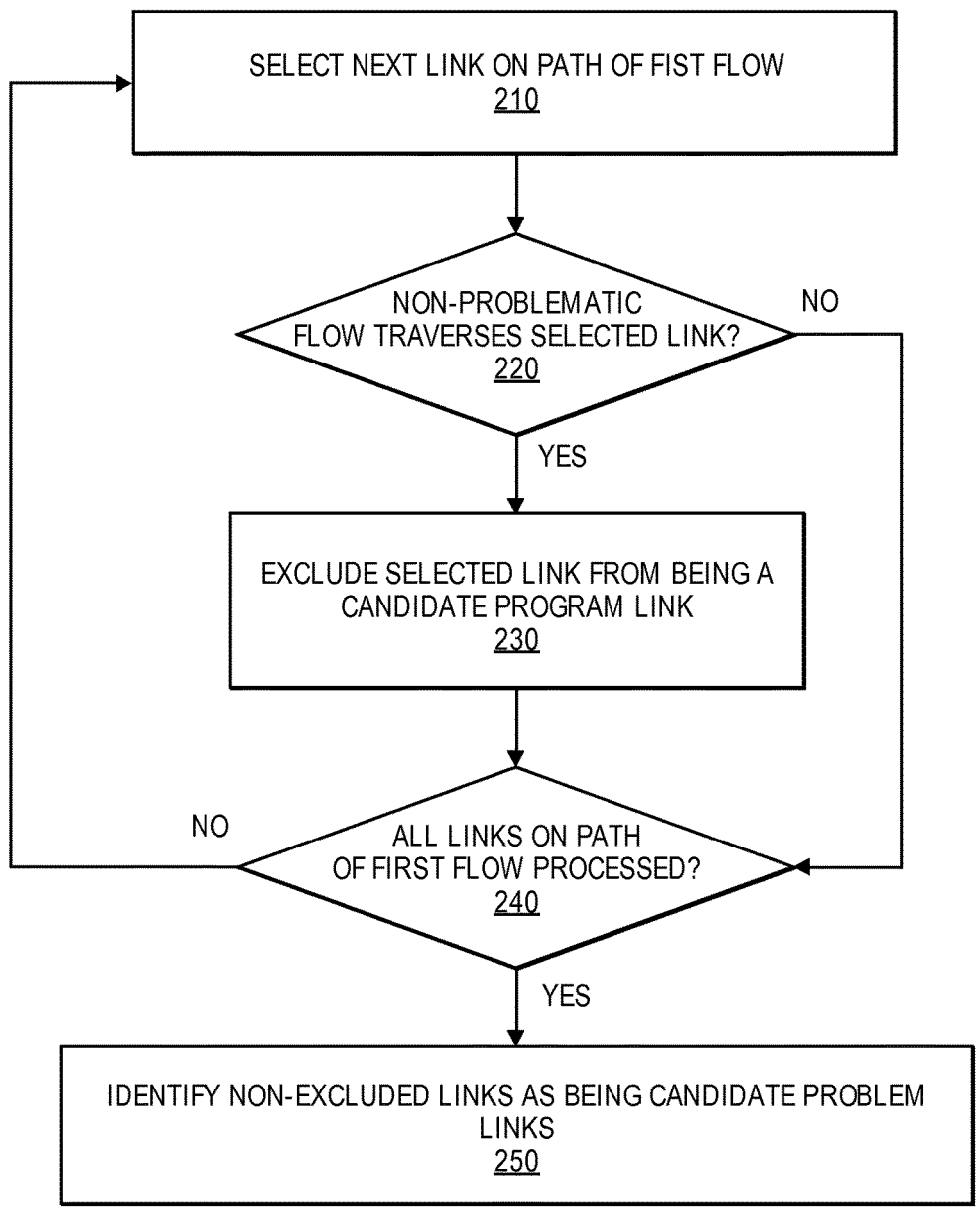
FIG. 2 is a flow diagram illustrating a process for determining a root cause of a performance issue in a network, according to some embodiments.

FIG. 2 is a flow diagram illustrating a process for determining a root cause of a performance issue in a network, according to some embodiments. The operations in the flow diagram may be implemented by a computing device 110 (e.g., RCA component 115). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The process identifies the candidate problem links for a flow that is experiencing a performance issue (e.g., long delay). The process starts by selecting a link on the path of the flow (i.e., the flow that is experiencing the performance issue) (block 210) and checks whether a non-problematic flow traverses the selected link (decision block 220). Whether a given flow is problematic can be determined based on the flow statistics for that flow. For example, a flow can be determined to be problematic if a flow metric value for that flow (e.g., delay) exceed a threshold value or if a flow metric value for that flow is abnormal for that flow (deviates from an average historical value for that flow by a threshold amount or a percentage amount). If a non-problematic flow traverses the selected link, then the selected link cannot be the source of the problem, and thus the selected link is excluded from being a candidate problem link (block 230). On the other hand, if a non-problematic flow does not traverse the selected link, then this means that all flows that traverse the selected link are problematic. As such, in this case, the selected link is not excluded from being a candidate problem link (i.e., it is a candidate problem link). The process then checks whether all links of the flow have been processed (decision block 240). If not, the process selects another link to be processed and repeats the operations of blocks 220-230 for that link. In this way, the process iterates through each link on the path of the flow and excludes certain links from being a candidate problem link. When all links on the path of the flow have been processed, the process identifies the non-excluded links as being candidate problem links (block 250). Another process or algorithm can then use the list of candidate problem links to reroute traffic around the candidate problem links, mandate maintenance of the candidate problem links, change network policies or quality of service (QoS) settings, or drop flows to ameliorate the performance issue.

In one embodiment, the process calculates a value for each link on the path of the flow that indicates whether the link is problematic or not. In one embodiment, the value is a ratio of the number of problematic flows that traverse the link to the number of total flows that traverse the link. A link having a ratio of 1 indicates that all flows that traverse that link are problematic and a link having a ratio of 0 indicates that no problematic flows traverse that link. In one embodiment, the value for a link is a weighted ratio that takes into account the number of flows that traverse a link. The process may use this ratio to determine whether the link is a candidate problem link.

If the process does not identify any candidate problem links, this means that the problem is likely outside of the control domain of the network monitoring system (e.g., the problem is somewhere in the Internet between the communication parties or in a host itself). If all or most of the candidate problem links are connected to a single node, then this may indicate that there is a problem with that node. The candidate problem links could be physical links, virtual network links bridged in a software switch, for example, by a Link Aggregation Group (LAG). If the candidate problem link is a LAG, then extra steps can be taken to analyze the physical links within the LAG to determine which physical link is the source of the problem. An exemplary application of the RCA algorithm described above is described with reference to FIG. 3A and FIG. 3B.

Figure 3A:
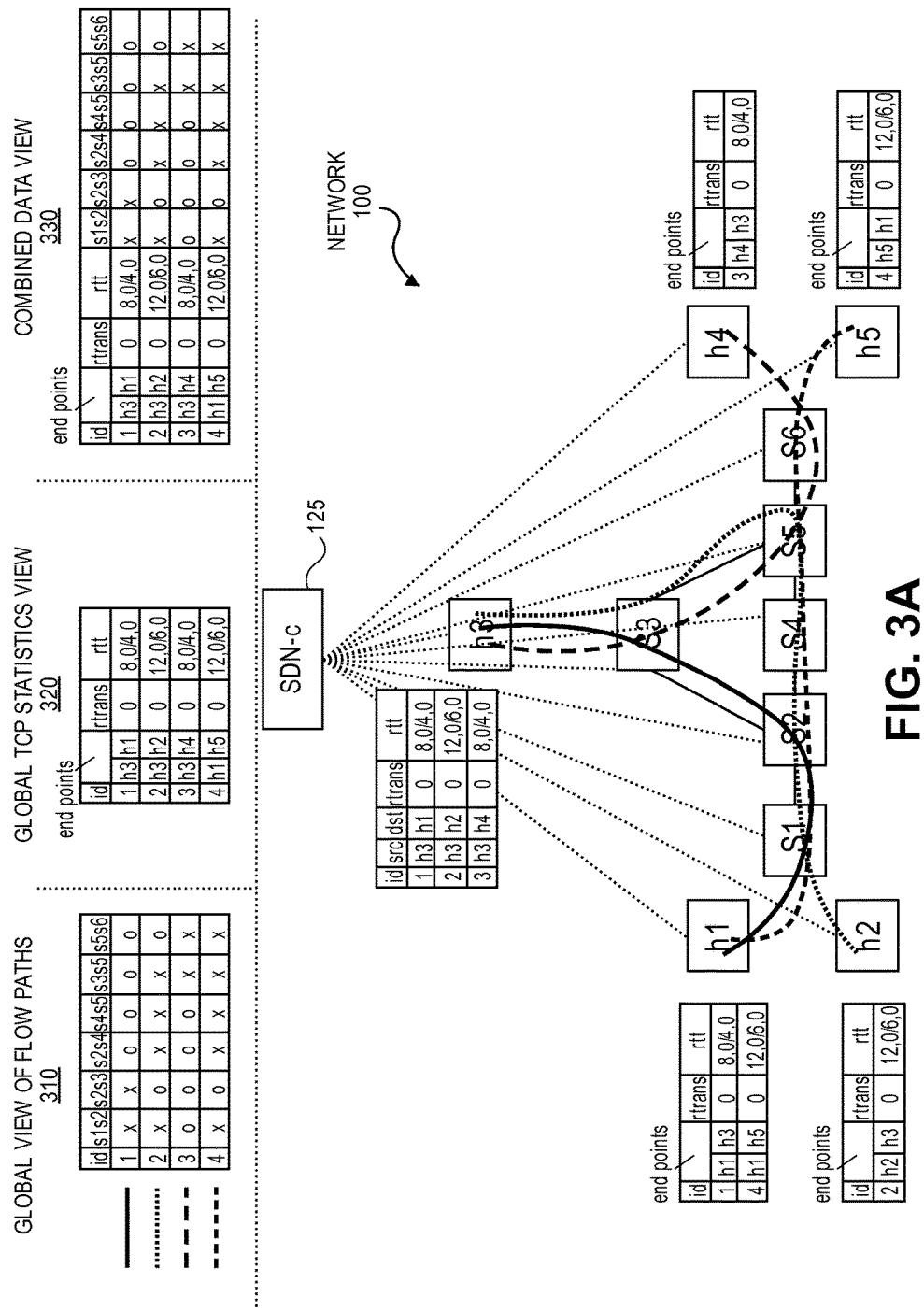
FIG. 3A is a block diagram illustrating flows in a network and various information related to the flows that can be used by an RCA algorithm to determine a root cause of a performance issue in a network, according to some embodiments.

FIG. 3A is a block diagram illustrating flows in a network and various information related to the flows that can be used by an RCA algorithm to determine a root cause of a performance issue in a network, according to some embodiments. The network 100 includes six switches (switches S1-S6) and five hosts (hosts H1-H5). The six switches S1-S6 are controlled by an SDN controller 125 (e.g., using OpenFlow). The network 100 has four flows. The first flow (flow 1) is between hosts H1 and H3. The first flow traverses switches S1, S2, and S3. The second flow is between host H2 and H3. The second flow (flow 2) traverses switches S1, S2, S4, S5, and S3. The third flow (flow 3) is between H3 and H4. The third flow traverses switches S3, S5, and S6. The fourth flow (flow 4) is between H1 and H5. The fourth flow traverses switches S1, S2, S4, S5, and S6. The SDN controller 125 has a global view of the flow path information in the network. That is, the SDN controller 125 has knowledge of the links that each flow traverses (e.g., the global view of flow paths table 310). The link that connects S1 and S2 is denoted as S1S2, the link that connects S2 and S2 is denoted as S2S2, and so on. The SDN controller 125 collects TCP statistics from the hosts H1-H5 (e.g., using a REST API provided by the hosts H1-H5) and thus has knowledge of the TCP statistics for each flow (e.g., global TCP statistics view table 320). As shown, the TCP statistics include the number of retransmissions (i.e., rtrans) and round trip time (i.e., rtt). For example, the TCP statistics for flow 1 indicates that the number of retransmissions is 0 and the round trip time is 8,0/4,0, where 8,0 is the most recent measurement (8 ms RTT, with 0 ms variance) and where 4,0 is the previous measurement (4 ms RTT, with 0 ms variance). The SDN controller 125 may combine the flow path information and the TCP statistics to generate a combined data view (e.g., combined data view table 330). An RCA algorithm can use the combined data view to determine a source of a performance issue in the network 100, as will be further illustrated in FIG. 3B.

Figure 3B:
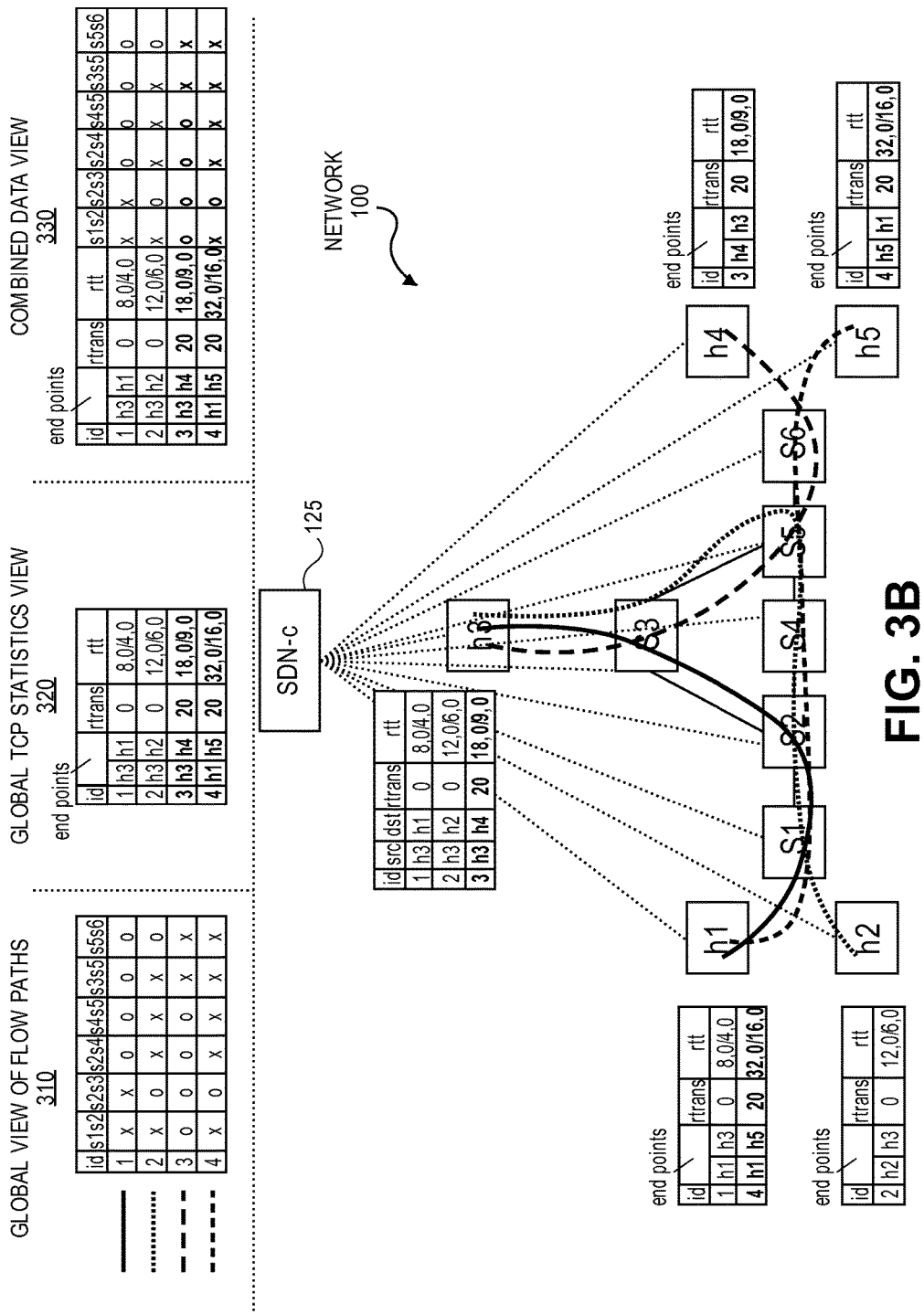
FIG. 3B is a block diagram illustrating flows in a network that are experiencing a performance issue, according to some embodiments.

FIG. 3B is a block diagram illustrating flows in a network that are experiencing a performance issue, according to some embodiments. In this example, a performance issue (e.g., long delay) experienced by flow 4 (between H1 and H5) triggers the RCA algorithm. When the SDN controller 125 updates its TCP statistics (shortly after flow 4 experiences a problem), the updated TCP statistics indicate that the number of retransmissions for flow 4 is 20 and the round trip time for flow 4 is higher at 32,0/16,0, where 32,0 is the most recent measurement (32 ms RTT, with 0 ms variance) and where 16,0 is the previous measurement (16 ms RTT, with 0 ms variance). These statistics indicate that flow 4 is experiencing a performance issue. For simplicity and clarity, the round trip time is assumed to be the same in both directions of a flow. The RCA algorithm described with reference to FIG. 2 or similar algorithm can be executed over the combined data view to determine the root cause of the performance issue of flow 4. The process iterates through each link on flow 4 (thus excluding links S2S3 and S3S5, which are not on path of flow 4). As the process iterates through each link on flow 4, the process will use the combined data view to determine that links S1S2, S2S4, and S4S5 each have a non-problematic flow that traverses them. As such, the process excludes these links from being the source of the performance issue. On the other hand, all flows that traverse link S5S6 (namely flows 3 and 4) are experiencing a problem, and thus the RCA algorithm identifies link S5S6 as a candidate problem link.

Figure 4A:
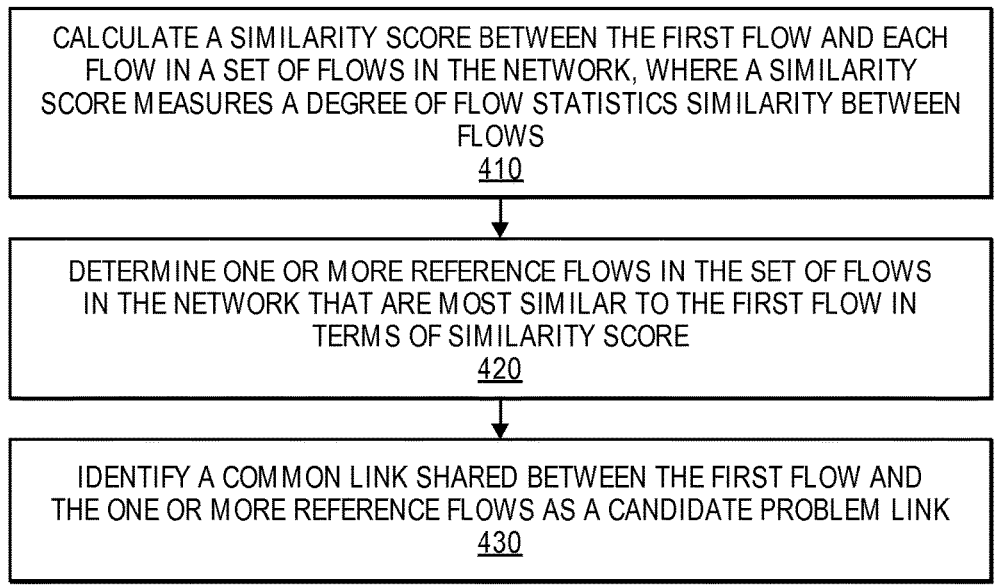
FIG. 4A is a flow diagram illustrating another process for determining a root cause of a performance issue in a network, according to some embodiments.

FIG. 4A is a flow diagram illustrating another process for determining a root cause of a performance issue in a network, according to some embodiments. In one embodiment, the operations of the flow diagram may be implemented by a computing device 110 (e.g., RCA component 115). The process is another example of an RCA algorithm. The process identifies the candidate problem links for a flow that is experiencing a performance issue (e.g., long delay). The process calculates a similarity score between the flow and each flow in a set of flows in the network (block 410). The similarity score measures a degree of flow statistics similarity between flows. In one embodiment, the flow statistics are TCP statistics. In one embodiment, the flow statistics can include various metrics such as a delay metric, a packet loss rate metric, and a number of retransmissions metric. Table 1 shows an example of flow statistics obtained for four flows, along with flow path information. The flow statistics include a delay metric, a packet loss rate metric, and a number of retransmissions metric. The flow statistics for flows can be obtained via the network monitoring system 120, as described above (e.g., by querying the host or configuring the host to publish flow statistics).

TABLE 1

| Flow ID | Delay Metric | Packet Loss Rate Metric | Number of Retransmissions Metric | Flow Path |
|---|---|---|---|---|
| 1 | 10 ms | 0.05 | 3 | 1-2-3 |
| 2 | 20 ms | 0.05 | 2 | 2-4-5-6 |
| 3 | 80 ms | 0.1 | 3 | 2-3-4-6 |
| 4 | 200 ms | 0 | 4 | 1-2-5-6 |

In one embodiment, the similarity score between flows is calculated based on the similarity of one or more metric values of the flows. However, different metrics may have a different value ranges, and this may cause certain metrics to influence the similarity score more heavily than other metrics. For example, delay values can range from a few milliseconds to hundreds of milliseconds, while packet loss rate is typically a percentage number. As such, in one embodiment, metric values are normalized before calculating the similarity scores. The metric values can be normalized such that all metric values for a given metric lie within a certain value range. For example, if a metric value for metric k for flow i is denoted as $M_i^k$, then metric values can be normalized such that:

$$M_i^k \in [0,1], \forall i,k$$

If there are N flows, then $M_i^k$ can be calculated as:

$$M_i^k = M_i^k \Big/ \max_j(M_j^k), i, j \leq N$$

Table 2 shows the flow statistics of Table 1 after normalization.

TABLE 2

| Flow ID | Delay Metric | Packet Loss Rate Metric | Number of Retransmissions Metric | Flow Path |
|---|---|---|---|---|
| 1 | 0.05 | 0.5 | 0.75 | 1-2-3 |
| 2 | 0.1 | 0.5 | 0.5 | 2-4-5-6 |

TABLE 2-continued

| Flow ID | Delay Metric | Packet Loss Rate Metric | Number of Retransmissions Metric | Flow Path |
|---|---|---|---|---|
| 3 | 0.4 | 1 | 0.75 | 2-3-4-6 |
| 4 | 1 | 0 | 1 | 1-2-5-6 |

Once the metric values are normalized, similarity scores can be calculated using the normalized metric values. For example, in one embodiment, a similarity score S between flows $f_i$ and $f_j$ can be calculated as follows:

$$S(f_i, f_j) = \sum_k \|M_i^k - M_j^k\|^2$$

The process then determines one or more reference flows in the set of flows in the network that are most similar to the flow in terms of similarity score (block 420). If a problem of a flow is caused by a certain link, the assumption is that the link will impact all flows that traverse that link. The process attempts to identify the flows that are impacted by the same problem as the problematic flow by identifying flows that exhibit similar behavior (e.g., increased delay) as the problematic flow. These flows are then designated as reference flows. For example, if a problematic link introduces a 500 ms delay, then all flows that traverse the problematic link will likely experience high delay. The process attempts to identify the flows in the network that have a similar high delay. In one embodiment, the process sorts the flows in the network based on similarity score and chooses m flows that are most similar to the problematic flow to be the reference flows. In this way, the process utilizes the similarity score to identify flows in the network that are experiencing a similar problem as the problematic flow.

The process then identifies a common link shared between the flow and the one or more reference flows as a candidate problem link (block 430). The reference flows are the flows that are deemed to be experiencing a similar problem as the problematic flow. As such, a common link shared between the problematic flow and the reference flows is likely to be the root cause of the performance issue. Flow path information of the problematic flow and the one or more reference flows can be used to identify the common link shared between the flow and the one or more reference flows. The flow path information for these flows can be obtained via the network monitoring system 120, as described above (e.g., based on NIB maintained by the SDN controller).

When the number of flows is large, it may not be practical to obtain the flow statistics for all the flows. In one embodiment, the process maintains a top-p list of flows for each link. The top-p list of flows for a link maintains the p flows traversing the link that have the highest flow statistic metric values. In one embodiment, a heap data structure may be used to store the top-p list of flows. When an alarm is received for a problematic flow, the process can query for the top-p flows from each link on the path of the problematic flow. An RCA algorithm similar to that described with reference to FIG. 2 can then be applied to these flows to determine a root cause of the problem. In one embodiment, an agent can be installed at a node (e.g., a switch) to keep track of the top-p flows originating or sinking at the node and to respond to queries for the top-p flows maintained by the node.

Figure 4B:
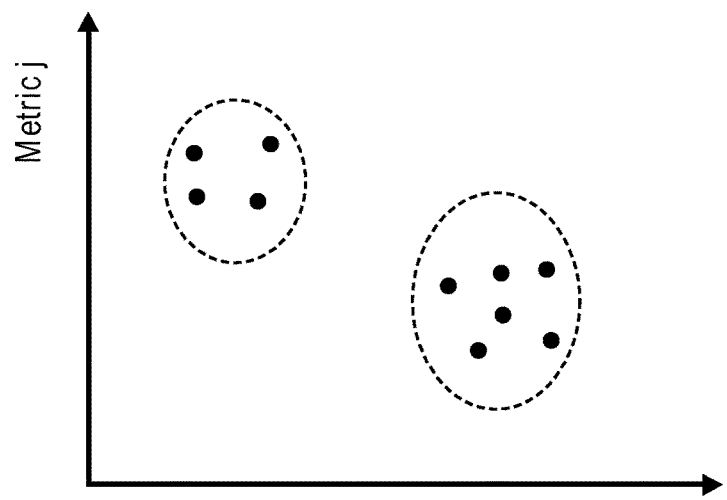
FIG. 4B is a diagram illustrating an example of a k-means clustering of flows, according to some embodiments.

In some cases, there can be multiple simultaneous failures in the network 100 (e.g., more than 1 link experiences congestion). In one embodiment, a k-means clustering algorithm can be used to identify the set of problematic links Given |F| metrics, each flow can be represented as a point in an |F|-dimensional space. The distance between two points can be considered as a similarity score. The points can be clustered into k clusters within the space using a k-means clustering algorithm. The dots that are clustered together represent the flows that are similar in terms of similarity score and each cluster represents an independent performance issue in the network. The common links shared among the clustered flows can be determined as a root cause of the problem. FIG. 4B is a diagram illustrating an example of a k-means clustering of flows in a 2-metric space (i.e., |F|=2), according to some embodiments. The graph shows dots (representing flows) that are grouped into two clusters. These clusters represent the possibility of two independent performance issues in the network.

Figure 5:
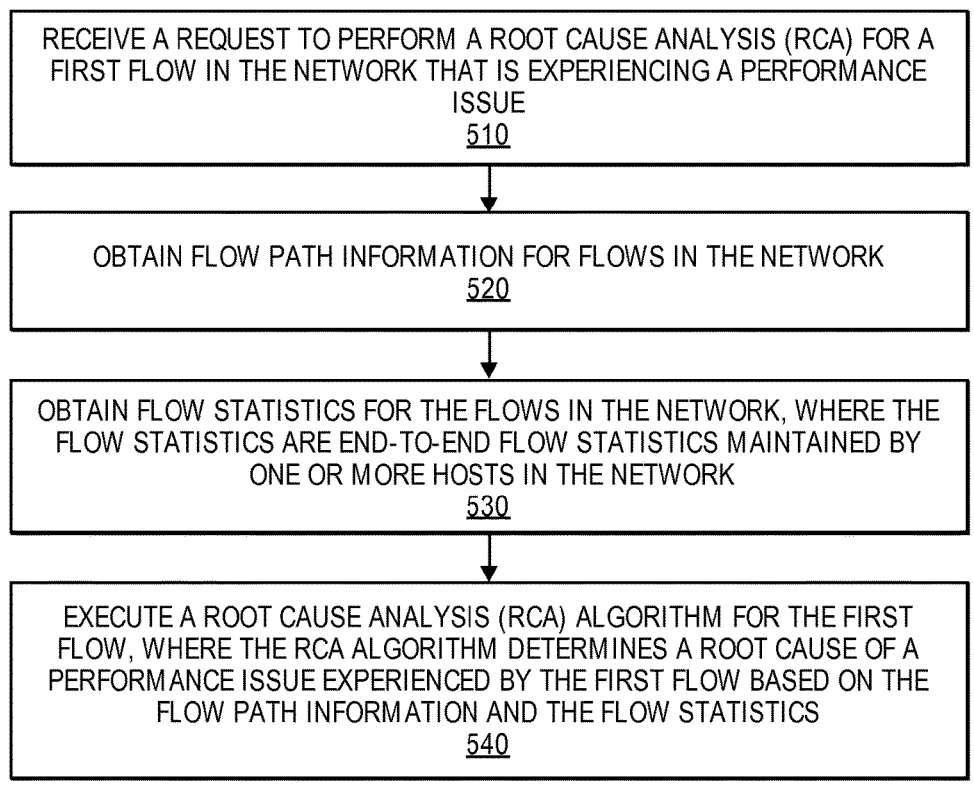
FIG. 5 is a flow diagram illustrating a general process for determining a root cause of a performance issue in a network, according to some embodiments.

FIG. 5 is a flow diagram illustrating a general process for determining a root cause of a performance issue in a network, according to some embodiments. In one embodiment, the operations of the flow diagram may be implemented by a computing device 110 (e.g., RCA component 115).

In one embodiment, the process is initiated when the computing device 110 receives a request to perform a root cause analysis for a first flow in the network that is experiencing a performance issue (block 510). In one embodiment, the request may be initiated by a network operator, for example, if the network operator receives complaints from subscribers regarding the performance of the first flow. In one embodiment, the request may be initiated by a network monitoring algorithm, for example, if the network monitoring algorithm detects abnormally long end-to-end delays or frequent packet drops for the first flow.

The computing device 110 obtains flow path information for flows in the network (block 520). The flow path information for flows in the network can be obtained via the network monitoring system, as described above (e.g., based on NIB maintained by the SDN controller).

The computing device 110 obtains flow statistics for the flows in the network (block 530). The flow statistics are end-to-end flow statistics maintained by one or more hosts in the network. In one embodiment, the flow statistics are TCP statistics. Examples of TCP statistics include, but are not limited to, a round trip time (RTT) metric, a packet loss rate metric, and a number of retransmissions metric. The flow statistics for flows can be obtained via the network monitoring system, as described above (e.g., by querying the host or configuring the host to publish flow statistics). For example, the computing device 110 can query a host for flow statistics maintained by that host (e.g., directly or via the network monitoring system 120). The computing device may then receive the flow statistics and store them in a flow statistics database. As another example, the computing device 110 can configure a host to publish flow statistics maintained by that host (e.g., directly or via the network monitoring system 120). When the host publishes the flow statistics, the computing device 110 may access the published flow statistics.

The computing device then 110 executes an RCA algorithm for the first flow (block 540). The RCA algorithm determines a root cause of a performance issue experienced by the first flow based on the flow path information and the flow statistics. The RCA algorithm may identify a link or a set of links on the path of the flow as candidate problem links. For example, the computing device 110 may execute the RCA algorithm described with reference to FIG. 2 or FIG. 4 to determine the root cause of the performance issue experienced by the first flow. By obtaining end-to-end flow statistics from the hosts, the process is able to perform a root cause analysis without the need for deploying specialized monitoring equipment into the network 100 to keep track of flow state.

Prediction Using Machine Learning

The results of the RCA algorithm can be used to train a machine learning system to predict performance issues in the network before they are reported by a network operator or a user. The machine learning system can predict performance issues in the network using machine learning techniques. Machine learning, as used herein, refers to any process that applies mathematical concepts to recognize patterns in a data set. The machine learning system is trained to learn the state of the network 100 at a time when the network 100 experienced a performance issue and can use this information to predict, based on a current state of the network 100, whether the network 100 is currently experiencing a performance issue or will experience a performance in the near future. An advantage of the machine learning system is that it can predict performance issues in the network 100 without having access to the flow statistics for flows in the network 100.

Figure 6:
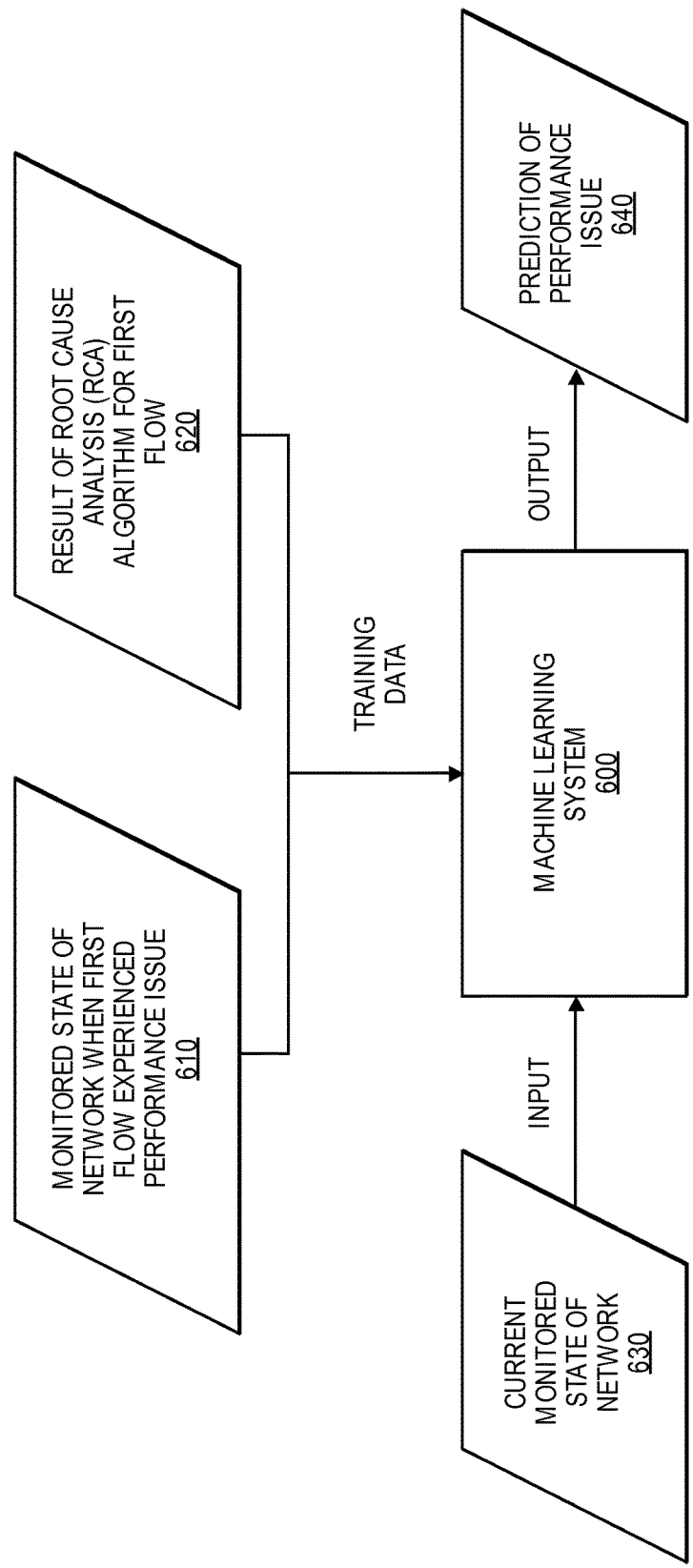
FIG. 6 is a block diagram illustrating a machine learning system, according to some embodiments.

FIG. 6 is a block diagram illustrating a machine learning system, according to some embodiments. The machine learning system 600 is trained using a monitored state of the network when a flow experienced a performance issue (e.g., data 610) and the result of the RCA algorithm for the flow (e.g., data 620). In one embodiment, the monitored state of the network can include any information about the network collected by the network monitoring system 120 or other monitoring devices (e.g., packet counts from probes deployed in the network 100, physical infrastructure metrics, and path information about where information is collected from), but not the flow statistics of the flows in the network 100. The machine learning system 600 receives as input a current monitored state of the network (e.g., data 630). The current monitored state of the network may include similar type of information as the data 610 that was used to train the machine learning system. The machine learning system 600 uses machine learning techniques to determine whether the current monitored state of the network is indicative of a performance issue in the network. In one embodiment, the machine learning system 600 utilizes knowledge of the flow rules in the network 100 in making this determination. The machine learning system 600 then outputs a prediction of a performance issue in the network (e.g., data 640). The prediction could be an indication of the paths at risk, the flows on those paths that may be affected, or a root cause. For example, the machine learning system 600 may have previously learned a correlation between a particular state of the network 100 and a problem in the network 100 (based on the training data). When the machine learning system 600 receives as input a similar state of the network 100, the machine learning system 600 can use machine learning techniques to predict that there is a problem in the network 100. The machine learning system 600 can be implemented using various machine learning techniques. For example, the machine learning system 600 can utilize any suitable machine learning technique including, but not limited to, decision trees, vector machines, neural networks (with neuron weights that can be interpreted as input importance), standard regression models (where parameter coefficients can be used to describe relationships between variables), principal component analysis, or any combination thereof.

If the machine learning system 600 predicts that a performance issue exists in the network, then it can trigger an appropriate follow-up action. For example, it can trigger an alarm to the network monitoring system 120, notify a closed loop network optimization engine that can reroute the traffic around the problem, trigger another root cause analysis mechanism, or other appropriate action to handle the problem.

Figure 7:
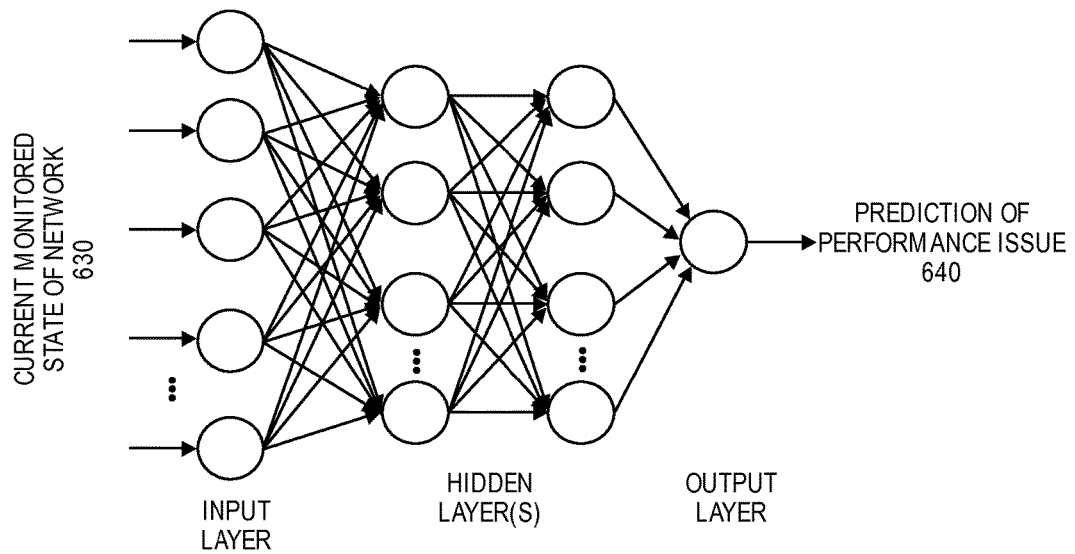
FIG. 7 is a diagram illustrating a neural network that can be implemented by a machine learning system, according to some embodiments.

FIG. 7 is a diagram illustrating a neural network that can be implemented by a machine learning system, according to some embodiments. As illustrated, the neural network (NN) includes an input layer, two hidden layers, and an output layer. Two hidden layers are shown by way of example and not limitation. Other embodiments may have more than two hidden layers. As illustrated, the nodes in each layer are connected to the nodes in the next adjacent layer. The neural network can be trained by adjusting the weights of the connections. The current monitored state of the network 630 is input into the input layer. The hidden layers process the input to determine whether the received input is indicative of a performance issue in the network 100. The output layer then outputs a prediction of the performance issue 640. The output could be a yes/no answer (i.e., problem exists or does not exist) or a probability that a performance issue exists in the network 100.

Figure 8:
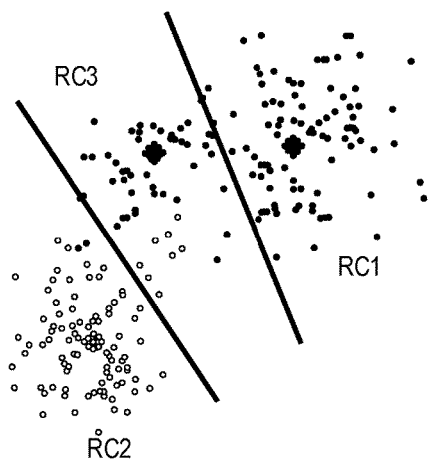
FIG. 8 is a diagram illustrating a simplified example of a k-means clustering of flows, according to some embodiments.

In one embodiment, a clustering algorithm is run in parallel with the neural network to determine a probable root cause of the performance issue. Since the root cause analysis has already been performed, this data could serve to create clusters representing each root cause. Then with each test data (e.g., same input as NN input), a k-means clustering algorithm or similar algorithm can determine where the data falls among the clusters. This will determine the root cause. FIG. 8 is a diagram illustrating a simplified example of a k-means clustering of flows, where the NN only has two input variables, $|F|=2$ (e.g., 2 probe types: network/SDN probes (solid points) and cloud/data center probes (hollow points)), and $k=3$ (i.e., the data is grouped (clustered) into three possible root causes), according to some embodiments.

FIG. 9A illustrates connectivity between network devices (NDs) within an exemplary network, as well as three exemplary implementations of the NDs, according to some embodiments. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link) An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE).

However, different embodiments of the invention may implement one or more of the software container(s) 962A-R differently. For example, while embodiments of the invention are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 9C:
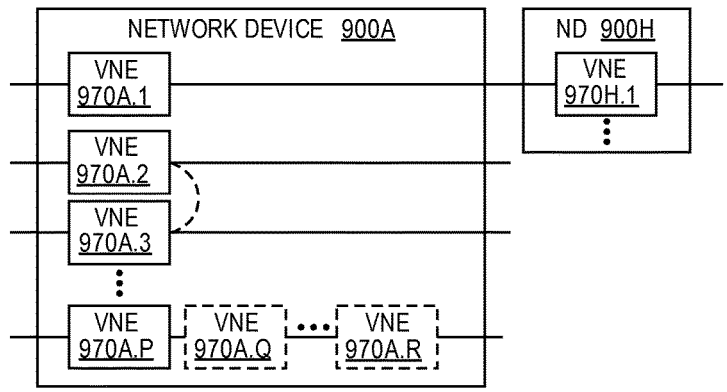
FIG. 9C illustrates various exemplary ways in which virtual network elements (VNEs) may be coupled according to some embodiments.

FIG. 9C illustrates various exemplary ways in which VNEs may be coupled according to some embodiments. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public web-pages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 9D:
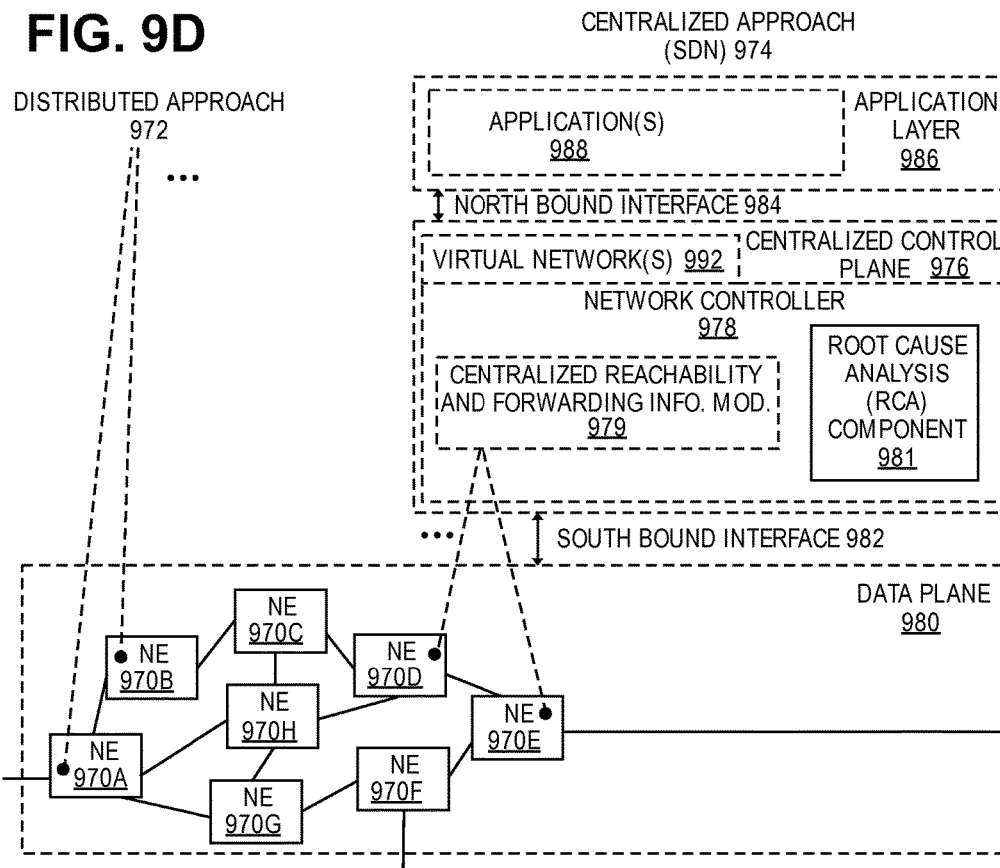
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. In one embodiment, the network controller 978 may include a root cause analysis (RCA) component 981 that when executed by the network controller 978, causes the network controller 978 to perform operations of one or more embodiments described herein above. In one embodiment, some of the operations of the one or more embodiments may also be performed at the application layer 986.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
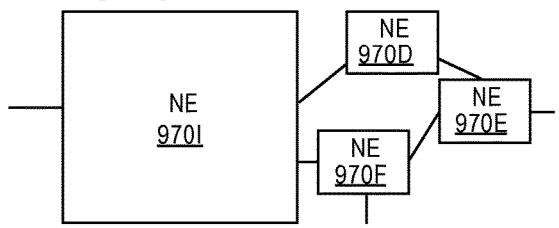
FIG. 9E illustrates the simple case of where each of the NDs implements a single NE, but a centralized control plane has abstracted multiple of the NEs in different NDs into (to represent) a single NE in one of the virtual network(s), according to some embodiments.
Figure 9F:
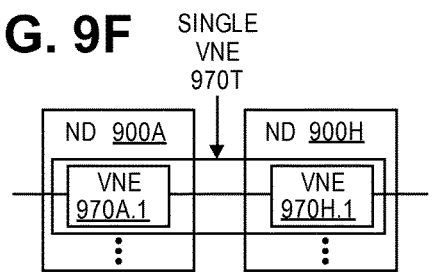
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 970I in one of the virtual network(s) 992 of FIG. 9D, according to some embodiments. FIG. 9E shows that in this virtual network, the NE 970I is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments. Thus, the abstraction of a NE or VNE can span multiple NDs.

While some embodiments implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
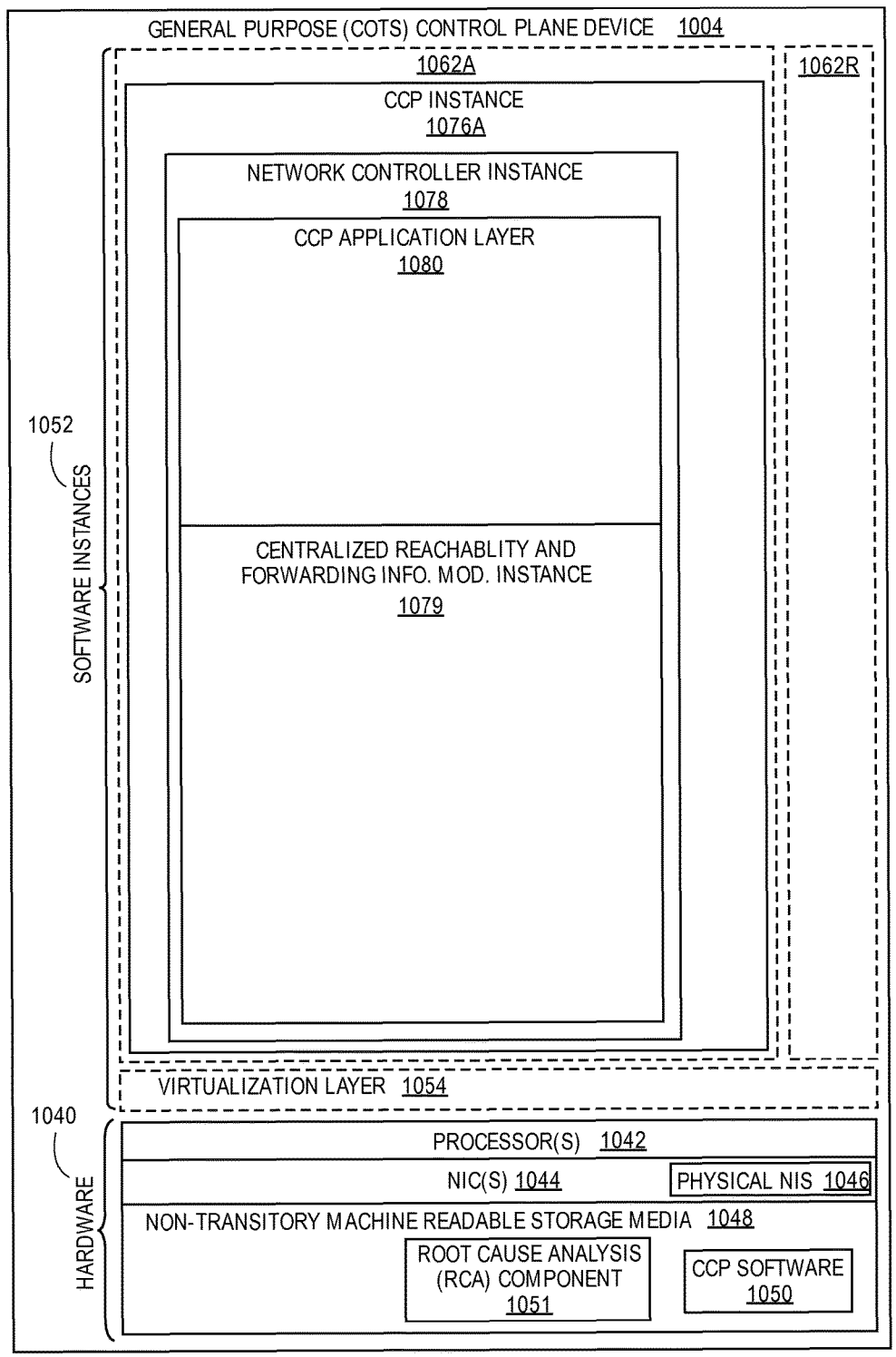
FIG. 10 illustrates a general purpose control plane device with centralized control plane (CCP) software, according to some embodiments.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050 and a root cause analysis (RCA) component 1051.

In embodiments that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1050 (illustrated as CCP instance 1076A) is executed within the software container 1062A on the virtualization layer 1054. In embodiments where compute virtualization is not used, the CCP instance 1076A on top of a host operating system is executed on the "bare metal" general purpose control plane device 1004. The instantiation of the CCP instance 1076A, as well as the virtualization layer 1054 and software containers 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The RCA component 1051 can be executed by hardware 1040 to perform operations of one or more embodiments of the present invention as part of software instances 1052.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NEs/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular Transmission Control Protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a computing device to, automatically and without user intervention, determine a root cause of a performance issue in a software defined networking (SDN) network using flow statistics maintained by a plurality of hosts in the network, the computing device coupled to a network monitoring system that collects real-time network and cloud metrics in the network, the method comprising:
   receiving a request to perform a root cause analysis (RCA) for a first flow in the network that is experiencing a performance issue;
   obtaining, from the network monitoring system, flow path information for flows in the network;
   obtaining, from the network monitoring system, flow statistics for the flows in the network, wherein the flow statistics are collected by the network monitoring system from the plurality of hosts, and
      wherein the flow statistics are end-to-end flow statistics maintained by the plurality of hosts for a plurality of end-to-end connections, each end-to-end connection being between one of the plurality of hosts and one or more other hosts in the network;
   executing an RCA algorithm for the first flow to determine a root cause of the performance issue based on the obtained flow path information and the obtained flow statistics; and
   configuring, using machine learning, the computing device to determine, at a later time, that the network is experiencing a subsequent performance issue without the computing device having to receive a request to perform an RCE responsive to the subsequent performance issue and without the computing device having to access the flow statistics for the flows based on the determined root cause of the performance issue.

2. The method of claim 1, wherein the network monitoring system collects flow statistics by
   querying a host for flow statistics maintained by the host,
   receiving the flow statistics maintained by the host from the host, and
   storing the flow statistics received from the host in a flow statistics database.

3. The method of claim 1, wherein the network monitoring system collects flow statistics by
   configuring a host to publish flow statistics maintained by the host and
   accessing the flow statistics published by the host.

4. The method of claim 1, wherein the flow statistics include transmission control protocol (TCP) flow statistics.

5. The method of claim 4, wherein the TCP flow statistics include any one of a round trip time (RTT) metric, a packet loss rate metric, and a number of retransmissions metric.

6. The method of claim 1, wherein executing the RCA algorithm comprises:
   determining, for each link in a set of links traversed by the first flow, whether a non-problematic flow traverses that link based on analyzing flow statistics of flows that traverse that link;
   excluding a link in the set of links traversed by the first flow from being a candidate problem link in response to determining that a non-problematic flow traverses that link; and
   identifying a non-excluded link in the set of links traversed by the first flow as being a candidate problem link.

7. The method of claim 6, wherein executing the RCA algorithm further comprises:
   calculating, for each link in the set of links traversed by the first flow, a ratio of a number of problematic flows that traverse that link to a number of total flows that traverse that link, wherein the ratio calculated for that link is used to determine whether that link is a candidate problem link.

8. The method of claim 1, wherein executing the RCA algorithm comprises:
   calculating a similarity score between the first flow and each flow in a set of flows in the network, wherein a similarity score measures a degree of flow statistics similarity between flows;
   determining one or more reference flows in the set of flows in the network that are most similar to the first flow in terms of similarity score; and
   identifying a common link shared between the first flow and the one or more reference flows as a candidate problem link.

9. The method of claim 8, wherein executing the RCA algorithm further comprises:
   normalizing flow statistics before calculating similarity scores.

10. The method of claim 1, further comprising:
    obtaining a monitored state of the network when the first flow experienced the performance issue;
    training a machine learning system to learn a correlation between the monitored state of the network when the first flow experienced the performance issue and a result of the RCA algorithm for the first flow;
    providing a current monitored state of the network as input to the machine learning system, wherein the machine learning system is configured to output a prediction of a performance issue in the network based on the input; and
    receiving, from the machine learning system, the prediction of the performance issue in the network.

11. A computing device for determining, automatically and without user-invention, a root cause of a performance issue in a software defined networking (SDN) network using flow statistics maintained by a plurality of hosts in the network, the computing device to be coupled to a network monitoring system that collects real-time network and cloud metrics in the network, the computing device comprising:
    a non-transitory machine-readable storage medium having stored therein a root cause analysis (RCA) component; and
    a set of one or more processors coupled to the non-transitory machine-readable storage medium, the set of one or more processors configured to execute the RCA component, the RCA component configured to receive a request to perform a root cause analysis for a first flow in the network that is experiencing a performance issue, obtain, from the network monitoring system, flow path information for flows in the network, obtain, from the network monitoring system, flow statistics for the flows in the network, wherein the flow statistics are collected by the network monitoring system from the plurality of hosts, wherein the flow statistics are end-to-end flow statistics maintained by the plurality of hosts for a plurality of end-to-end connections, each end-to-end connection being between one of the plurality of hosts and one or more other hosts in the network, execute an RCA algorithm for the first flow to determine a root cause of the performance issue based on the obtained flow path information and the obtained flow statistics, initiate corrective action to resolve the performance issue based on the root cause determined by the RCA algorithm, and configure, using machine learning, the computing device to determine, at a later time, that the network is experiencing a subsequent performance issue without the computing device having to receive a request to perform an RCA responsive to the subsequent performance issue and without the computing device having to access the flow statistics for the flows based on the determined root cause of the performance issue.

12. The computing device of claim 11, wherein the RCA component is further configured to obtain a monitored state of the network when the first flow experienced the performance issue, train a machine learning system to learn a correlation between the monitored state of the network when the first flow experienced the performance issue and a result of the RCA algorithm for the first flow, and provide a current monitored state of the network as input to the machine learning system, wherein the machine learning system is configured to output a prediction of a performance issue in the network based on the input, the RCA component further configured to receive, from the machine learning system, the prediction of the performance issue in the network.

13. A non-transitory machine-readable storage medium having computer code stored therein, which when executed by a set of one or more processors of a computing device, causes the computing device to perform operations for determining, automatically and without user intervention, a root cause of a performance issue in a software defined networking (SDN) network using flow statistics maintained by a plurality of hosts in the network, the computing device to be coupled to a network monitoring system that collects real-time network and cloud metrics in the network, the operations comprising:
    receiving a request to perform a root cause analysis (RCA) for a first flow in the network that is experiencing a performance issue;
    obtaining, from the network monitoring system, flow path information for flows in the network;
    obtaining, from the network monitoring system, flow statistics for the flows in the network, wherein the flow statistics are collected by the network monitoring system from the plurality of hosts, and wherein the flow statistics are end-to-end flow statistics maintained by the plurality of hosts for a plurality of end-to-end connections, each end-to-end connection being between one of the plurality of hosts and one or more other hosts in the network;

executing an RCA algorithm for the first flow to determine a root cause of the performance issue based on the obtained flow path information and the obtained flow statistics; and configuring, using machine learning, the computing device to determine, at a later time, that the network is experiencing a subsequent performance issue without the computing device having to receive a request to perform an RCA responsive to the subsequent performance issue and without the computing device having to access the flow statistics for the flows based on the determined root cause of the performance issue.

14. The non-transitory machine-readable storage medium of claim 13, wherein the network monitoring system collects flow statistics by querying a host for flow statistics maintained by the host, receiving the flow statistics maintained by the host from the host, and storing the flow statistics received from the host in a flow statistics database.

15. The non-transitory machine-readable storage medium of claim 13, wherein the network monitoring system collects flow statistics by configuring a host to publish flow statistics maintained by the host and accessing the flow statistics published by the host.

16. The non-transitory machine-readable storage medium of claim 13, wherein the flow statistics include transmission control protocol (TCP) flow statistics.

17. The non-transitory machine-readable storage medium of claim 16, wherein the TCP flow statistics include any one of a round trip time (RTT) metric, a packet loss rate metric, and a number of retransmissions metric.

18. The non-transitory machine-readable storage medium of claim 13, wherein executing the RCA algorithm comprises:

determining, for each link in a set of links traversed by the first flow, whether a non-problematic flow traverses that link based on analyzing flow statistics of flows that traverse that link;

excluding a link in the set of links traversed by the first flow from being a candidate problem link in response to determining that a non-problematic flow traverses that link; and identifying a non-excluded link in the set of links traversed by the first flow as being a candidate problem link.

19. The non-transitory machine-readable storage medium of claim 18, where executing the RCA algorithm further comprises:

calculating, for each link in the set of links traversed by the first flow, a ratio of a number of problematic flows that traverse that link to a number of total flows that traverse that link, wherein the ratio calculated for that link is used to determine whether that link is a candidate problem link.

20. The non-transitory machine-readable storage medium of claim 13, wherein executing the RCA algorithm comprises:

calculating a similarity score between the first flow and each flow in a set of flows in the network, wherein a similarity score measures a degree of flow statistics similarity between flows;

determining one or more reference flows in the set of flows in the network that are most similar to the first flow in terms of similarity score; and identifying a common link shared between the first flow and the one or more reference flows as a candidate problem link.

21. The non-transitory machine-readable storage medium of claim 20, wherein executing the RCA algorithm further comprises:

normalizing flow statistics before calculating similarity scores.

22. The non-transitory machine-readable storage medium of claim 13, wherein the computer code, when executed by the set of one or more processors, causes the computing device to perform further operations comprising:

obtaining a monitored state of the network when the first flow experienced the performance issue;

training a machine learning system to learn a correlation between the monitored state of the network when the first flow experienced the performance issue and a result of the RCA algorithm for the first flow;

providing a current monitored state of the network as input to the machine learning system, wherein the machine learning system is configured to output a prediction of a performance issue in the network based on the input; and receiving, from the machine learning system, the prediction of the performance issue in the network.

* * * * *